(12) United States Patent
Hernandez, Jr. et al.

(10) Patent No.: US 10,807,220 B2
(45) Date of Patent: Oct. 20, 2020

(54) BRAKE SPREADER TOOL

(71) Applicant: Alltrade Tools LLC, Cypress, CA (US)

(72) Inventors: Hector R. Hernandez, Jr., Fullerton, CA (US); Greg Livingston, Phoenix, AZ (US); Eric Hennings, Anaheim, CA (US)

(73) Assignee: Alltrade Tools LLC, Cypress, CA (US)

( * ) Notice: Subject to any disclaimer, the term of this patent is extended or adjusted under 35 U.S.C. 154(b) by 259 days.

(21) Appl. No.: 15/698,971

(22) Filed: Sep. 8, 2017

(65) Prior Publication Data

US 2019/0076997 A1 Mar. 14, 2019

(51) Int. Cl.
*B25B 27/00* (2006.01)
*F16D 65/00* (2006.01)

(52) U.S. Cl.
CPC ...... *B25B 27/0021* (2013.01); *B25B 27/0035* (2013.01); *F16D 65/0043* (2013.01)

(58) Field of Classification Search
CPC . B25B 27/0021; B25B 27/0035; Y10T 29/53; Y10T 29/53683; Y10T 29/53796; F16D 65/0043
USPC .............................................. 29/239; 81/63.1
See application file for complete search history.

(56) References Cited

U.S. PATENT DOCUMENTS

| | | | | |
|---|---|---|---|---|
| 2,232,247 A * | 2/1941 | Laub | ...................... | B25B 25/005 254/100 |
| 5,018,261 A * | 5/1991 | Markous | ............... | B25B 27/023 29/239 |
| 5,479,689 A * | 1/1996 | Schmit | ..................... | B25B 27/00 29/239 |
| 6,427,995 B1 * | 8/2002 | Steinwall | .............. | B25B 1/2405 269/283 |
| 6,574,846 B1 * | 6/2003 | Kang | ................... | B25B 27/0021 29/239 |
| 7,996,972 B2 | 8/2011 | Hu | | |
| 8,826,504 B1 * | 9/2014 | Slivon | ................. | B25B 27/0035 29/239 |
| 10,156,273 B1 * | 12/2018 | Huang | ................ | F16D 65/0043 |
| 10,371,220 B2 * | 8/2019 | Wu | ........................ | B25B 13/463 |
| 2004/0123438 A1 * | 7/2004 | Kang | ................... | B25B 27/0021 29/239 |

(Continued)

FOREIGN PATENT DOCUMENTS

CA          1229472 A  * 11/1987    ......... F16D 65/0043

*Primary Examiner* — Joseph J Hail
*Assistant Examiner* — Arman Milanian
(74) *Attorney, Agent, or Firm* — Fulwider Patton LLP; David J. Ptman

(57) ABSTRACT

A tool for retracting at least one piston into a mating cylinder bore of a caliper assembly provided with a set of brake pads to be serviced, the tool comprising: a first pressure plate; a second pressure plate; a coupler joining the first pressure plate with the second pressure plate, the coupler comprising: a bushing affixed to the first pressure plate along an axis perpendicular to the first pressure plate such that the bushing can rotate about, but cannot move along, the axis in relation to the first pressure plate, wherein the bushing defines a bore that is internally threaded; a stud affixed to the second pressure plate along the axis such that the stud cannot rotate about, nor move along, the axis in relation to the second pressure plate, the stud defining an external thread, wherein the stud is threadedly inserted into the bore of the bushing.

4 Claims, 5 Drawing Sheets

(56) References Cited

U.S. PATENT DOCUMENTS

| | | | |
|---|---|---|---|
| 2012/0151727 A1* | 6/2012 | Dewell | B25B 27/10 29/237 |
| 2012/0204393 A1* | 8/2012 | Gentner | B25B 27/0035 29/257 |
| 2012/0266428 A1* | 10/2012 | Hodges | B25B 5/068 29/239 |
| 2018/0335097 A1* | 11/2018 | Dahl | B25B 27/0035 |

* cited by examiner

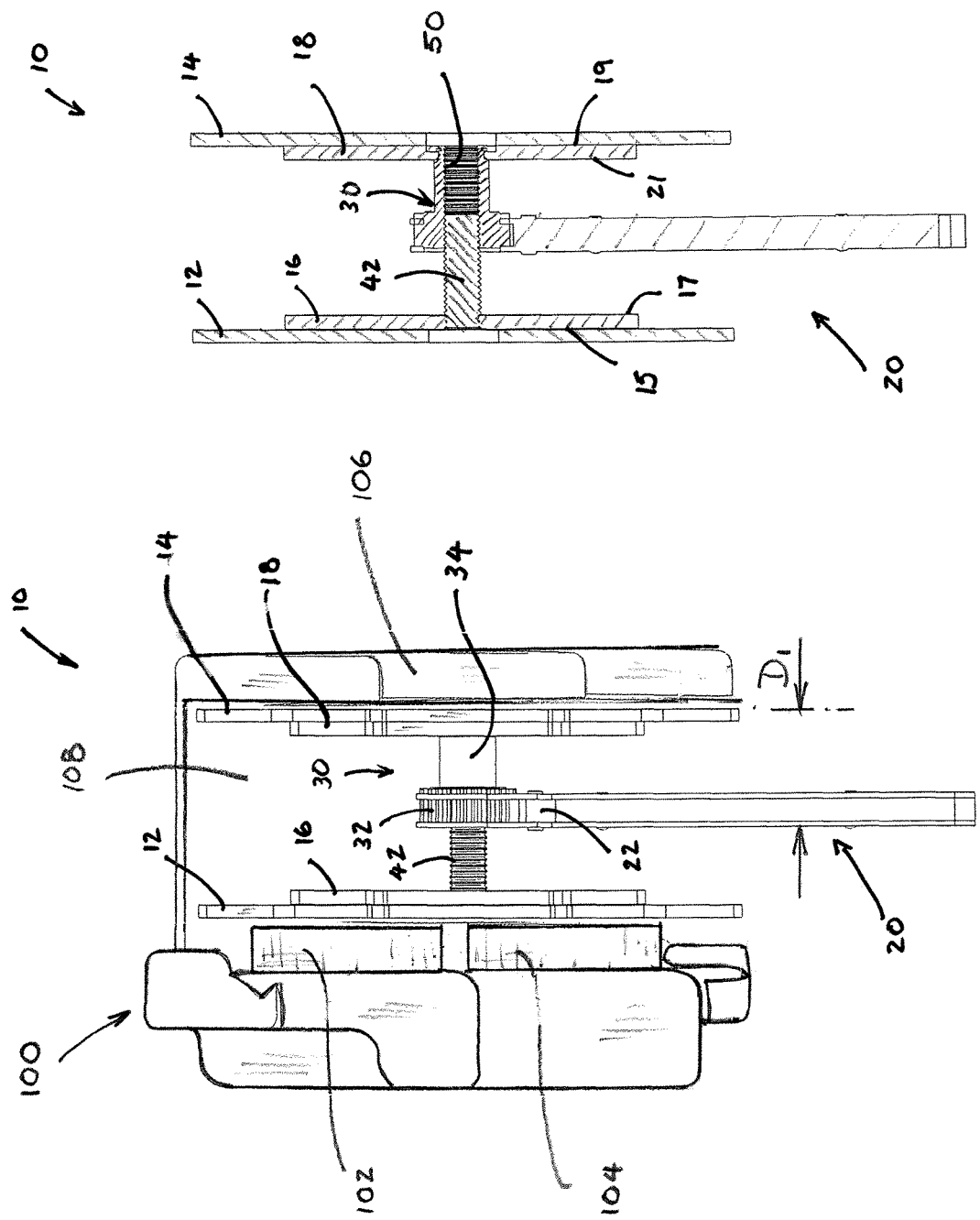

BRAKE SPREADER TOOL

BACKGROUND

The present disclosure relates generally to tools for changing disc brake pads on a disc brake caliper assembly. More particularly, the present disclosure pertains to a tool for moving or pressing a disc brake piston into a retracted position relative to a cylinder of the disc brake caliper assembly in order to allow the replacement of worn brake pads in the caliper assembly.

In the repair of vehicles and, more particularly, with respect to the repair of vehicle braking systems having disc brakes, various special tools are desirable. Disc brakes typically include a caliper housing which is positioned adjacent a vehicle wheel assembly having a rotor or brake disc rotatably mounted therewith. The caliper housing is associated with at least one piston which moves back and forth in a cylinder, and includes a pair of opposed brake pads for clamping the rotor in response to movement of the piston. When a driver presses a brake pedal, brake fluid is forced from a master cylinder into the cylinder associated with the caliper housing to push the piston(s), and force engagement of the brake pads against the rotor to stop rotation of the wheel. When linings of the brake pads are worn too thin under a certain thickness after a period of use, the brake pads are required to be replaced with new ones to maintain a proper braking force during driving. However, with a continuous wearing to the linings of the brake pads, the piston gradually travels outwardly into the interior of the caliper housing to make the space of accommodating the brake pads progressively narrower. In such circumstances, the caliper housing is typically removed from the wheel assembly for the vehicle, and a special tool is used to spread the brake pads apart and/or to force or press the piston(s) back to an initial position in the cylinder(s) after which the brake pads can be replaced. The caliper housing can then be reinstalled in the wheel assembly and positioned with the new brake pads adequately accommodated in the caliper housing for engagement with the rotor.

A variety of spreader and brake press tools are known to be used by auto mechanics responsible for the repair of disc brakes and the replacement of brake pads. Some tools include two plates that are separated from each other under force, using a ratcheted handle which is fitted to a coupler extending between the plates. Under known brake separation systems, this has the effect of separating the plates from each other while the handle remains at the midpoint between the plates.

However, this system creates its own problems, because while the handle remains at the midpoint between the plates, it is slowly moved more distant from each of the plates during separation, when viewed from the perspective of the handle. If one of the plates is held stationary in relation to the surrounding mechanical features of the braking system, this slow movement creates the difficulty that the handle may be moved towards a mechanical object surrounding the brake pads which obstructs the movement of the handle in a cramped and confined space.

Another problem with such systems as the above is that when there is more than one piston that moves back and forth to move the disc brake, then the spacing between those pistons may become a limiting factor for using such systems. Specifically, the size of the plates may be sufficient when the spacing is small, but insufficient when the spacing is large. In such cases, a different spreader system must be used for the larger spacing than for the smaller spacing.

Accordingly, there remains a need in servicing brake pads to provide a tool for effectively retracting the one or more pistons of various caliper housing designs with improved ease of use. The present invention addresses these and other needs.

SUMMARY OF THE INVENTION

In one embodiment, the invention is a tool for retracting at least one piston into a mating cylinder bore of a caliper assembly provided with a set of brake pads to be serviced. The tool comprises a first pressure plate having an outer surface, and an inner surface. A second pressure plate having an outer surface, and an inner surface is provided. A coupler joins the first pressure plate with the second pressure plate. The coupler comprises a bushing affixed to the first pressure plate along an axis perpendicular to the first pressure plate such that the bushing can rotate about, but cannot move along, the axis in relation to the first pressure plate, wherein the bushing defines a bore that is internally threaded. A stud is affixed to the second pressure plate along the axis such that the stud cannot rotate about, nor move along, the axis in relation to the second pressure plate, the stud defining an external thread, wherein the stud is threadedly inserted into the bore of the bushing. A ratcheting wrench assembly is connected to the bushing for providing selective reversible rotation of the bushing relative to the first pressure plate and the second pressure plate. Under this structural arrangement, selective rotation of the ratcheting wrench assembly causes threading and, alternatively, unthreading of the stud in the bore and movement of the second pressure plate along the axis in relation to the first pressure plate.

In some embodiments, the invention further comprises a first supplementary plate being larger than the first pressure plate and being positioned in contact with the outer surface of the first pressure plate; and a second supplementary plate being larger than the second pressure plate and being positioned in contact with the outer surface of the second pressure plate. Under this embodiment, the first supplementary plate defines at least one bump, and the first pressure plate defines, on the outer surface, at least one dimple that is sized to mate with the at least one bump. Under further embodiments, at least one of the first pressure plate and the first supplementary plate include a magnet, for facilitating releasable connection between the first pressure plate and the first supplementary plate.

In another embodiment, the invention is a method of retracting at least one piston into at least one cylinder bore of a caliper assembly provided with a set of brake pads to be serviced. The method comprises inserting a first pressure plate and a second pressure plate between the at least one piston and the caliper assembly. Then a ratcheting wrench assembly attached to a coupler separating the first pressure plate from the second pressure plate is rotated, the ratcheting wrench assembly being initially positioned a certain distance from the first pressure plate. Thereafter, separating the first pressure plate from the second pressure plate while maintaining constant the certain distance during the rotating step.

In some embodiments, the method further includes, prior to the inserting step, attaching a first supplementary plate to an external surface of the first pressure plate; and attaching a second supplementary plate to an external surface of the second pressure plate. In further embodiments, attaching a first supplementary plate to the first pressure plate includes lining up at least one mating bump on the first supplementary plate with at least one mating dimple on the first pressure plate. In further embodiments, attaching a first supplementary plate to the first pressure plate includes using a magnet on either the first supplementary plate or the first pressure plate to effect a releasable connection.

These, and other advantages will become apparent when the specification is read in conjunction with the figures and the detailed description of some embodiments.

BRIEF DESCRIPTION OF THE DRAWINGS

FIG. 4 is a vertical front view of the tool in FIG. 1, shown in a second expanded condition against cylinders in a brake caliper.

FIG. 5 is a vertical sectional view of the tool shown in FIG. 4

DETAILED DESCRIPTION OF SOME EMBODIMENTS

Figure 1:
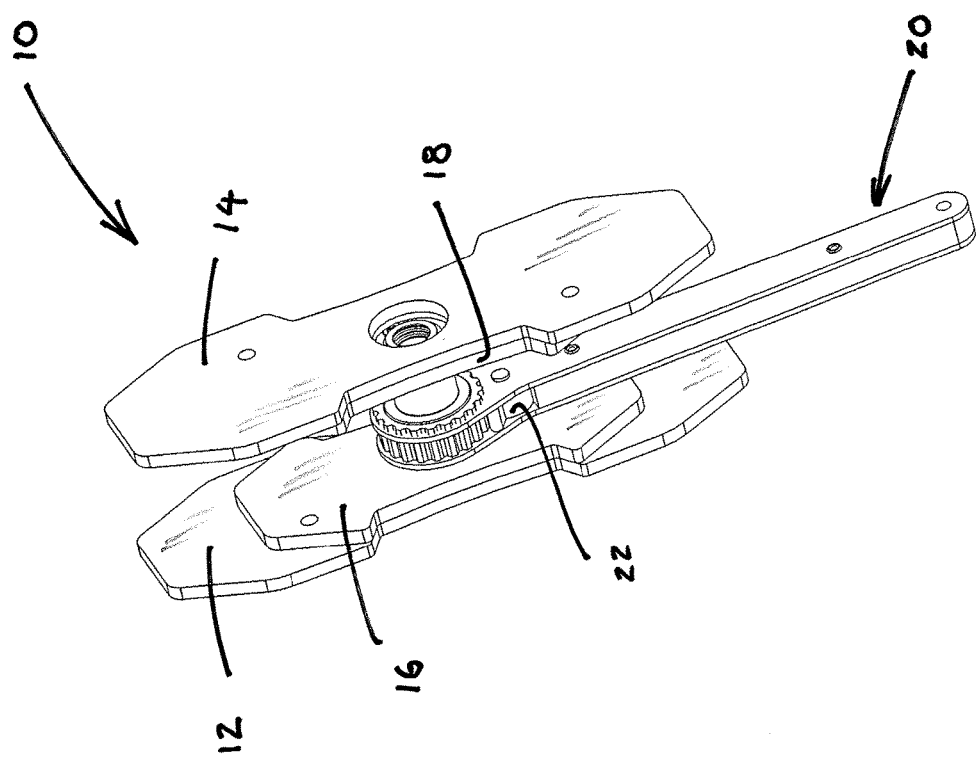
FIG. 1 is a perspective view of a tool having features of the present invention.

Referring now to the drawings, FIG. 1 illustrates a hand tool in the form of a disc brake piston retractor tool 10 used for compressing one or more pistons into a caliper housing when replacing a set of brake pads installed therein.

The tool 10 generally comprises a first pressure plate 16, a second pressure plate 18, a coupler 30 interconnecting the first and second pressure plates 16, 18 and a reversible ratchet wrench assembly 20 connected to the coupler 30.

Referring to FIGS. 1-6, the pressure plates 16, 18 are substantially identical to each other in shape and thickness and are preferably constructed of steel. Pressure plate 16 has an outer surface 15 and an inner surface 17. Pressure plate 18 has an outer surface 19, and an inner surface 21.

The coupler 30 extends between the pressure plates 16, 18 and comprises two elements, namely, a rotatable bushing 34 and a fixed stud 42 defining an external thread.

Figure 7:
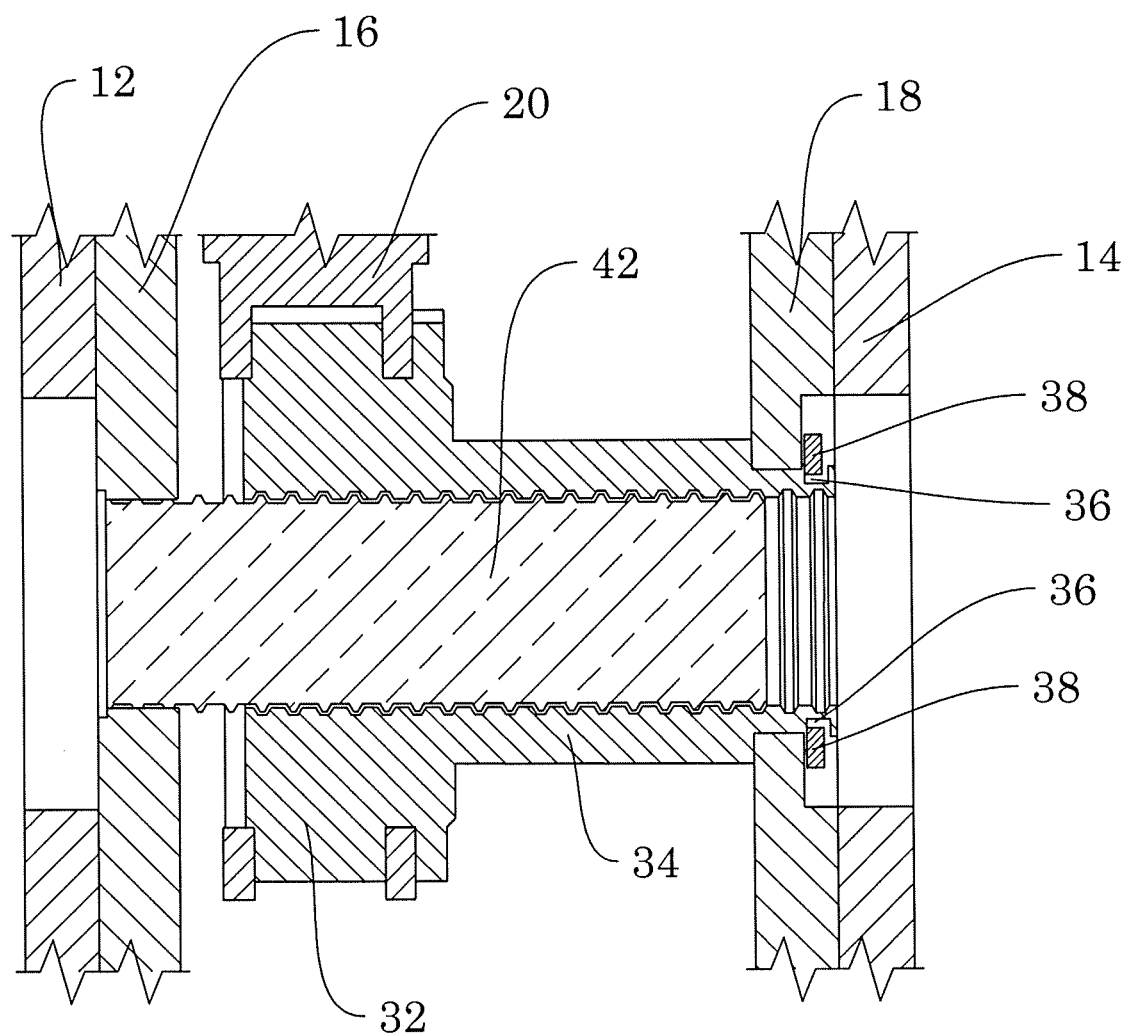
FIG. 7 is a detail view of a central portion of FIG. 3.

The rotatable bushing 34 defines an external groove 36 at a proximal end. (Best seen in FIG. 7). The pressure plate 18 defines an opening 40 at its center. The proximal end of the bushing is passed through the opening 40 to an external side of the pressure plate 18, leaving the body of the rotatable bushing on the internal side of the pressure plate. An external retaining ring 38 (best seen FIGS. 6 and 7) is slipped into the groove 36 so as to secure the rotatable bushing attached to the pressure plate 18 while the bushing remains free to rotate about its own axis A-A without moving along that axis in relation to the pressure plate 18. At a distal end, the rotatable bushing defines a toothed circular ratchet 32. Preferably, the ratchet has a diameter larger than the diameter of the balance of the bushing 34 to give greater mechanical advantage. As will be described further herein, the ratchet is configured to engage with a handle 20 having an oscillating pawl 22 in a known manner. A further aspect of the rotatable bushing 34 is that it defines an internal threaded bore 50, sized to receive the external thread on the stud 42.

The stud 42 is fixedly connected to the opposing pressure plate 16, so that it cannot rotate or slide along its axis. This may be accomplished by inserting the stud through a hole in the center of the pressure plate 16, and then broadening the end of the stud by forging or by welding, or other known means of attachment.

In some embodiments, the resulting tool 10 may be provided with supplementary pressure plates 12, 14. These supplementary pressure plates may be given a similar shape to the primary pressure plates 16, 18, but are larger than the primary pressure plates so that, when placed in contact with the primary pressure plates they completely cover the primary pressure plates and overlap to an extent, as desired. The supplementary pressure plates have small studs or bumps 52 which are configured to mate with negative bumps 52' (dimples) on the external surfaces of the primary plates. These studs and dimples allow the supplementary plates 12, 14 to align correctly with the primary plates when they are installed. Magnets 60 (FIG. 6) may be provided, preferably on both the pressure plates 16, 18 and the supplementary plates 12, 14 (although it is necessary to be placed on only one of the plates so long as the other is made of metal), and aligned with each other, to provide an easy releasable connection between the two sets of plates. The magnets may be cylindrical in shape, and may be inserted into cylindrical holes drilled into the respective plates. Thus, once the plates are aligned correctly by the bump and dimple configuration, they remain together and allow the user to move the tool around without the plates coming apart. This provides a very useful way of keeping the tool together in use, and after use when it may be put into a toolbox with other tools.

In use, the tool 10 is used as follows. The plates (primary plates 16, 18 or supplementary plates 12, 14 where they are installed), connected by the coupler 32 carrying the handle 20, are inserted into an interior space 108 of the brake caliper 100 (FIG. 4) between the pistons 102, 104 that are to be retracted, and a fixed wall 106 of the caliper. The pawl 22 is set in known manner to drive the plates apart, and the handle 20 is moved in an oscillating fashion back and forth to rotate the bushing 34 in only a clockwise direction. This action causes the stud 42 to travel in the bore 50 of the bushing 30 to cause the plates to separate from each other. In this regard, the tool moves from a contracted condition shown in FIGS. 2-3 to an expanded condition shown in FIGS. 4-5, and in so doing, depressing the pistons 102, 104 into their cylinders. The device may then be retracted a small amount and removed from the space 108, so that the brake pads may then be easily replaced and the caliper housing 100 may be reassembled with the wheel assembly.

It will be appreciated that, due to the novel structure of the tool 10, the distance D1 between the outer surface of the plate 14 or 18 attached to the bushing 34, and the opposite outer edge of the handle 20, does not change between the contracted condition (FIGS. 2-3) and the expanded condition (FIGS. 4-5). This feature gives the tool a novel functional advantage. If the tool is first inserted between the pistons 102, 104 and the caliper wall 106 in such a manner that the handle 20 is rotatable without obstruction by structures surrounding the caliper 100 workspace, then when the handle is rotated and the plates 16, 18 are separated further from each other, the handle does not move its position in relation to the caliper wall 106 and cannot become obstructed by obstacles during use.

Further, a user of the tool may discover that the primary plates 16, 18 are not large enough to reach all of the pistons that operate the brake lining. Ordinarily, in the prior art, this would require the user to acquire a different tool with larger plates. However, in some embodiments the invention allows the user to install larger supplementary plates 12, 14 over the smaller primary plates 16, 18, and then proceed to use the same tool successfully to cover the more widely spaced pistons. Such use is exemplified in FIG. 4.

Figure 3:
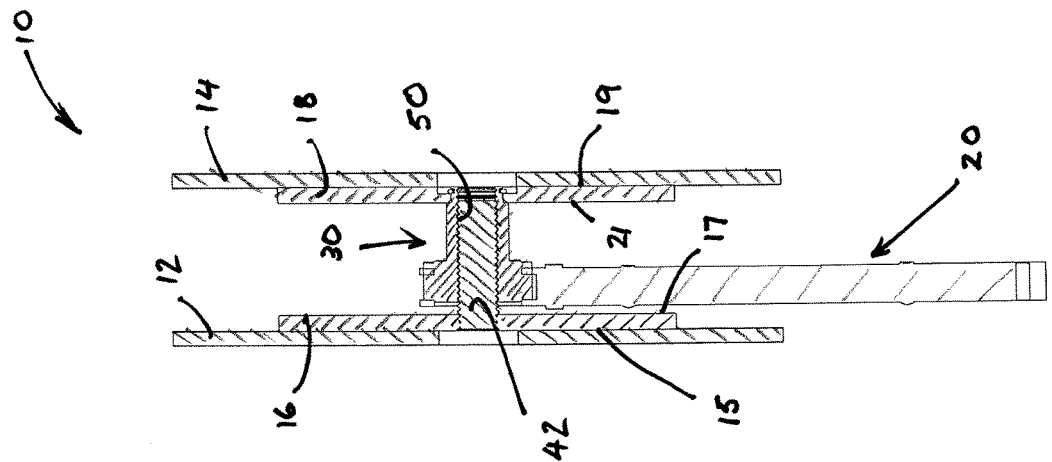
FIG. 3 is a vertical sectional view of the tool shown in FIG. 2.
Figure 2:
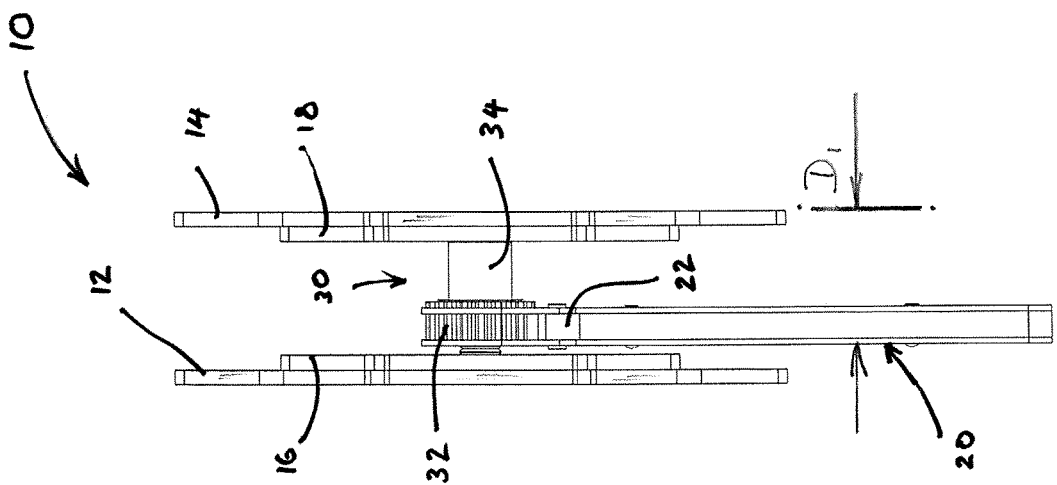
FIG. 2 is a vertical front view of the tool in FIG. 1, shown in a first retracted condition.
Figure 6:
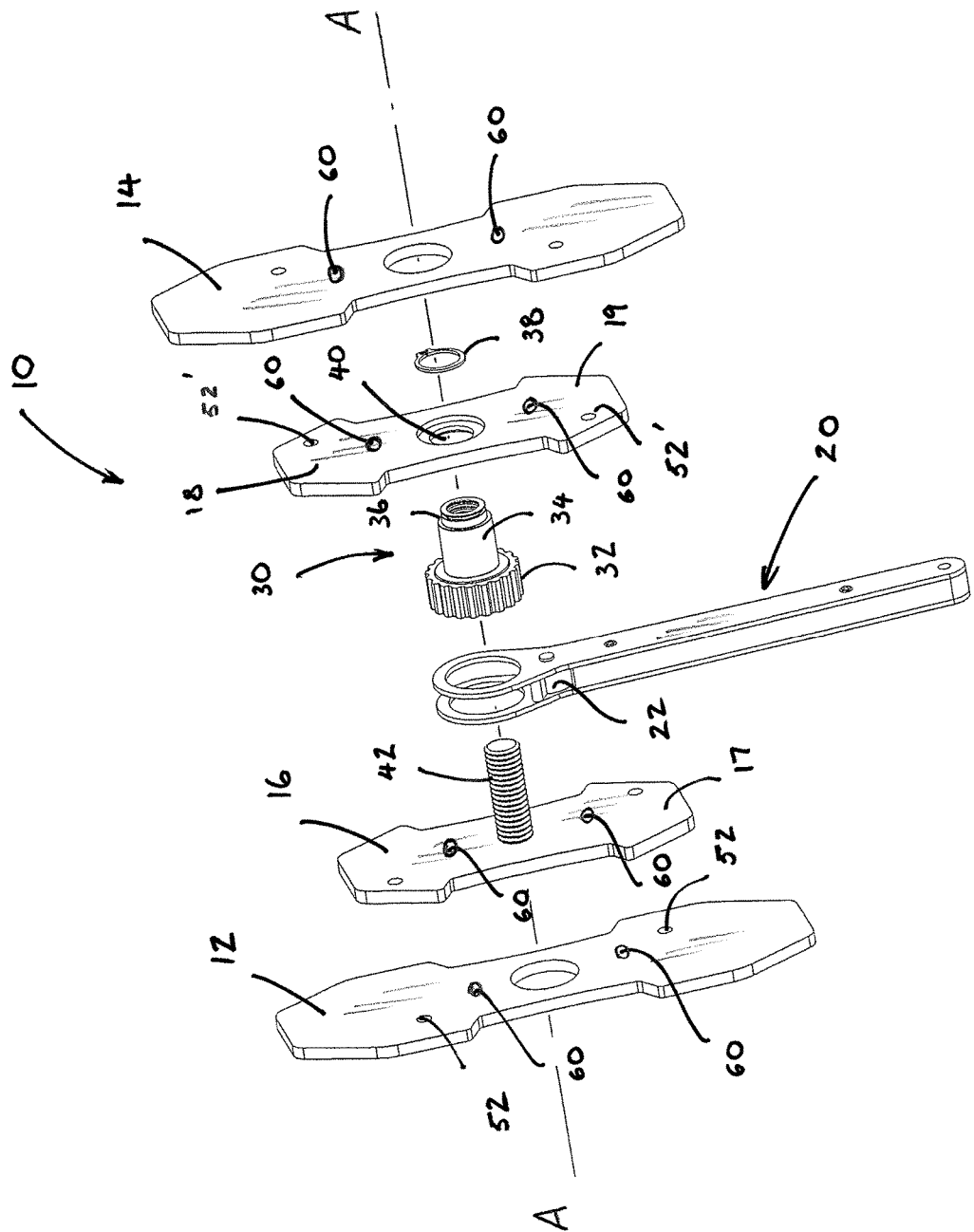
FIG. 6 is an exploded view of the tool in FIG. 1.

Finally, once the pistons 102, 104 have been retracted into their cylinders, the user may withdraw the tool 10 by retracting the plates to their starting position as shown in FIGS. 2-3. This may be achieved by switching the pawl 22 to a reverse setting in a known manner, and then oscillating the handle back and forth to rotate the bushing in a counter-clockwise direction so that the stud is drawn back into the bore 50 of the bushing, drawing the plates closer together.

Thus, there is described a novel system and method that addresses needs in the art. The present invention may, of course, be carried out in other specific ways than those herein set forth without departing from the essential characteristics of the invention. The present embodiments are, therefore, to be considered in all respects as illustrative and not restrictive, while the scope of the invention is set forth in the claims that follow.

We claim:

1. A tool for retracting at least one piston into a mating cylinder bore of a caliper assembly provided with a set of brake pads to be serviced, the tool comprising:
    a first pressure plate having a first outer surface lying in a first outer plane, and a first inner surface lying in a first inner plane, wherein the first pressure plate defines an opening at its center;
    a second pressure plate having a second outer surface, and a second inner surface;
    a coupler joining the first pressure plate with the second pressure plate, the coupler comprising:
        a bushing defining a groove at a proximal end, wherein the proximal end of the bushing is positioned in the opening of the first pressure plate and a retaining ring is installed in the groove, wherein the retaining ring is located in a position between the first outer plane and the first inner plane, and whereby the bushing is affixed to the first pressure plate along an axis perpendicular to the first pressure plate such that the bushing can rotate about, but cannot move along, the axis in relation to the first pressure plate, wherein the bushing defines a bore that is internally threaded;
        a stud affixed to the second pressure plate along the axis such that the stud cannot rotate about, nor move along, the axis in relation to the second pressure plate, the stud defining an external thread, wherein the stud is threadedly inserted into the bore of the bushing;
    a ratcheting wrench assembly connected to the bushing for providing selective reversible rotation of the bushing relative to the first pressure plate and the second pressure plate;
    whereby selective rotation of the ratcheting wrench assembly causes threading and unthreading of the stud in the bore and movement of the second pressure plate along the axis in relation to the first pressure plate.

2. The tool of claim 1, further comprising:
    a first supplementary plate being larger than the first pressure plate and being positioned in contact with the first outer surface of the first pressure plate; and
    a second supplementary plate being larger than the second pressure plate and being positioned in contact with the second outer surface of the second pressure plate.

3. The tool of claim 2, wherein the first supplementary plate defines at least one bump, and the first pressure plate defines, on the outer surface, at least one dimple that is sized to mate with the at least one bump.

4. The tool of claim 2, wherein at least one of the first pressure plate and the first supplementary plate include a magnet, for facilitating releasable connection between the first pressure plate and the first supplementary plate.

* * * * *